US010835043B2

(12) United States Patent
Ferguson

(10) Patent No.: US 10,835,043 B2
(45) Date of Patent: Nov. 17, 2020

(54) MODULAR FURNITURE AND SUPPORT THEREFOR

(71) Applicant: Saw and Sew Ltd., London (GB)

(72) Inventor: James Winston Richard Ferguson, Cracow (PL)

(73) Assignee: Saw and Sew Ltd., London (GB)

( * ) Notice: Subject to any disclaimer, the term of this patent is extended or adjusted under 35 U.S.C. 154(b) by 0 days.

(21) Appl. No.: 16/111,969

(22) Filed: Aug. 24, 2018

(65) Prior Publication Data
US 2020/0060423 A1    Feb. 27, 2020

(51) Int. Cl.
*A47C 4/02*         (2006.01)
*F16B 1/00*         (2006.01)
*F16B 12/44*       (2006.01)
*F16B 12/10*       (2006.01)

(52) U.S. Cl.
CPC ............... *A47C 4/02* (2013.01); *A47C 4/021* (2013.01); *F16B 1/00* (2013.01); *F16B 12/10* (2013.01); *F16B 12/44* (2013.01); *F16B 2001/0028* (2013.01); *F16B 2001/0035* (2013.01); *F16B 2012/106* (2013.01)

(58) Field of Classification Search
CPC .......... A47C 4/02; A47C 4/021; A47C 4/024; F16B 1/00; F16B 12/10; F16B 12/44; F16B 2001/0028; F16B 2001/0035; F16B 2001/106
USPC .................................................... 297/440.16
See application file for complete search history.

(56) References Cited

U.S. PATENT DOCUMENTS

| | | | |
|---|---|---|---|
| 3,278,227 A * | 10/1966 | Rowland ................. | A47C 4/03 297/239 |
| 3,528,096 A | 9/1970 | Moberg | |
| 3,672,723 A | 6/1972 | DeCursu et al. | |
| 4,618,185 A * | 10/1986 | Kaufman ............... | A47C 3/023 297/285 |
| 6,783,182 B1 | 8/2004 | Gallagher | |
| 6,935,698 B1 * | 8/2005 | Chen ........................ | A47C 4/02 297/440.22 |
| 2010/0019549 A1 * | 1/2010 | Huang ..................... | A47C 3/00 297/170 |
| 2011/0089739 A1 * | 4/2011 | Huang ..................... | A47C 4/02 297/440.23 |
| 2012/0187741 A1 * | 7/2012 | Kumazawa ............. | A47C 5/10 297/463.1 |

(Continued)

*Primary Examiner* — Mark R Wendell
(74) *Attorney, Agent, or Firm* — The Law Office of Roger S. Thompson

(57) ABSTRACT

A support for a piece of modular furniture, and a piece of modular furniture which includes the support. The support includes first and second legs connected by a longitudinal member and a support member. The support member extends generally transversely to the longitudinal member in a direction allowing it to extend under a seat and support the seat. The piece of furniture preferably includes two or more such supports, each having a support member which extends towards the other support, so that they together may support the seat. The supports are generally universal in design, in that a single type of support may be used to make many different types of furniture, such as a chair, a sofa, an end table and a full table. Chairs and sofas may include backs, and therefore the supports used with such types of furniture include extensions which support the back.

16 Claims, 4 Drawing Sheets

(56) References Cited

U.S. PATENT DOCUMENTS

2015/0015051 A1\* 1/2015 Huang ................. A47C 3/04
  297/445.1
2015/0159686 A1\* 6/2015 Davotian ............ A47C 19/005
  5/282.1

\* cited by examiner

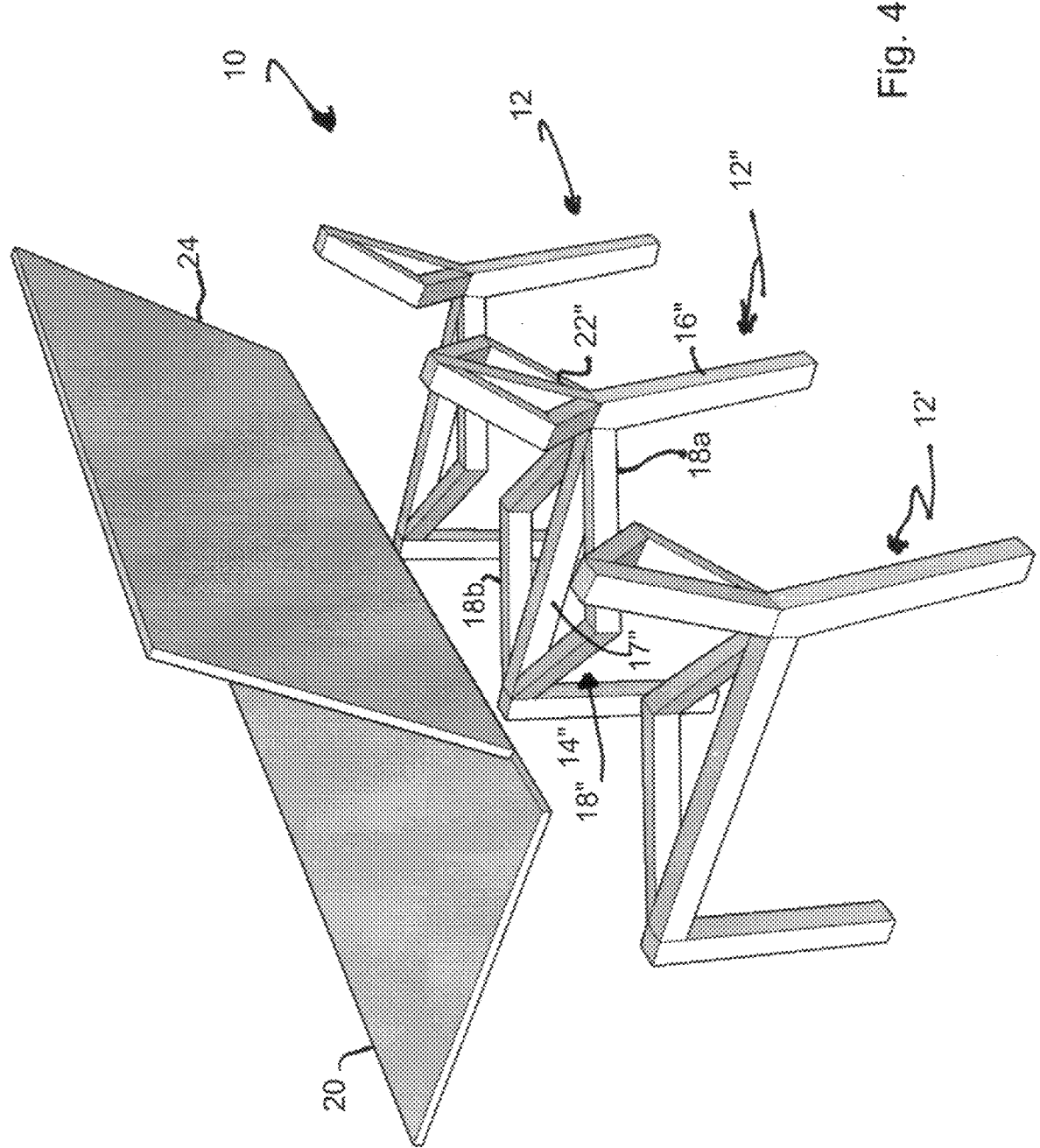

MODULAR FURNITURE AND SUPPORT THEREFOR

BACKGROUND OF THE INVENTION

1. Field of the Invention

The invention is directed to furniture and, more particularly, to the field of modular furniture manufacturing.

2. Description of the Related Art

The concept of modular furniture has been known for many years. As used herein, the term "modular furniture" refers to furniture made with standard units and parts. The use of standard, interchangeable components allows the swift and assured assembly of the desired furniture. Further, the use of standardized components may reduce the costs and speed the assembly of the furniture.

There have been many types of modular furniture in the past. For example, U.S. Pat. No. 3,672,723 to DeCursu, et al. was a relatively early endeavor in this direction, but one that still used a number of different parts. It describes a modular furniture assembly in which leg assemblies engage a box-shaped seat member. The seat member has a fixed width and depth and has a bottom which provides support for the user when in the furniture.

U.S. Pat. No. 3,528,096 to Moberg, is another attempt at modular furniture, but is directed to furniture made of only two elements: a pair of opposed legs and a seat. The legs are connected by a member which may serve as the back of a chair, so that the entire chair has only two different kinds of components. It also requires no fasteners. However, this over-simplified structure is very limited and gives the ultimate user a highly restricted and inflexible design. The legs, again, provide no support to the seat in the space between the legs. The seat must provide its own support.

U.S. Pat. No. 6,783,182 to Gallagher is a still further attempt to provide easy-to-assemble furniture utilizing standardized components yet it, too, results in a limited range of styles and appearances. Furthermore, the legs thereof offer no support for the seat member.

There is therefore still a need in the art for a new design and method for producing modular furniture which allows for the quick assembly of a range of furniture with a suitable range of design and features, while maintaining the benefits of modularity. In particular, all of the mentioned prior patents describe modular furniture having pre-defined widths (i.e., the distance from side-to-side of the furniture), and requiring that the seats provide their own support. There is therefore also a need for modular furniture which can provide additional support for the seat member of the furniture while still allowing the furniture to be made to any desired width and in any desired configuration and maintaining the benefits of standardization association with modular furniture. As used herein, the term "seat member" or "seat" refers to any generally horizontal piece of the furniture. It would include the seat of a chair or sofa, and would include, for ease of reference, a tabletop, and may include cushions or padded material if intended to act as a seat of a chair or sofa.

SUMMARY OF THE INVENTION

It is an object of the invention to provide an improved support for modular furniture, and modular furniture which utilizes such a support.

It is a further object of the invention to provide a support for a piece of modular furniture, and a piece of modular furniture including such a support which allows for the use of a limited number of different kinds of supporting pieces in the assembly thereof, while maintaining the ability to provide a wide range of customized and customizable pieces of furniture.

It is a still further object of the invention to provide a support for a piece of modular furniture which provides for improved support of a seat, and a piece of modular furniture which includes such a seat.

It is yet another object of the invention to provide a piece of modular furniture which may be assembled quickly and easily, with the use of a minimum number of different pieces, while still offering variety in the design of the piece of furniture constructed therewith.

Briefly stated, the invention is a support for a piece of modular furniture, and a piece of modular furniture assembled from such a support. The support comprises: a base having first and second legs connected by a longitudinal member, and a support member, for supporting a seat. The longitudinal member extends in a first direction. The support member extends from the longitudinal member in a second direction generally transverse to the first direction, so that the support member may extend under the seat and provide support thereto.

In a preferred embodiment, the support may further comprise a back support which extends from one of the legs in a third direction generally transverse to both the first and second directions.

In a still further preferred embodiment, the support may further include a fastener for fastening the seat to the support. In refinements of the invention, the fastener may be one piece of a two-piece fastener, such as a hook-and-loop fastener, a snap fastener, a tongue-and-groove fastener, a threaded fastener, a magnetic fastener, and a male/female fastener. In still further refinements, the seat includes the other piece of the two-piece fastener.

In yet another preferred embodiment, the support member includes at least two braces which extend generally in the second direction, whereby the braces may support the seat. In refinements of this embodiment, each of two supports have such braces which extend towards the other support and under the seat, so as to provide improved support for the seat which is supported thereby.

Other objects and features of the present invention will become apparent from the following detailed description of the presently preferred embodiments, considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 4 is a rear exploded perspective of a piece of modular furniture utilizing three supports in accordance with the invention.

DETAILED DESCRIPTION OF THE PRESENTLY PREFERRED EMBODIMENTS

Figure 1:
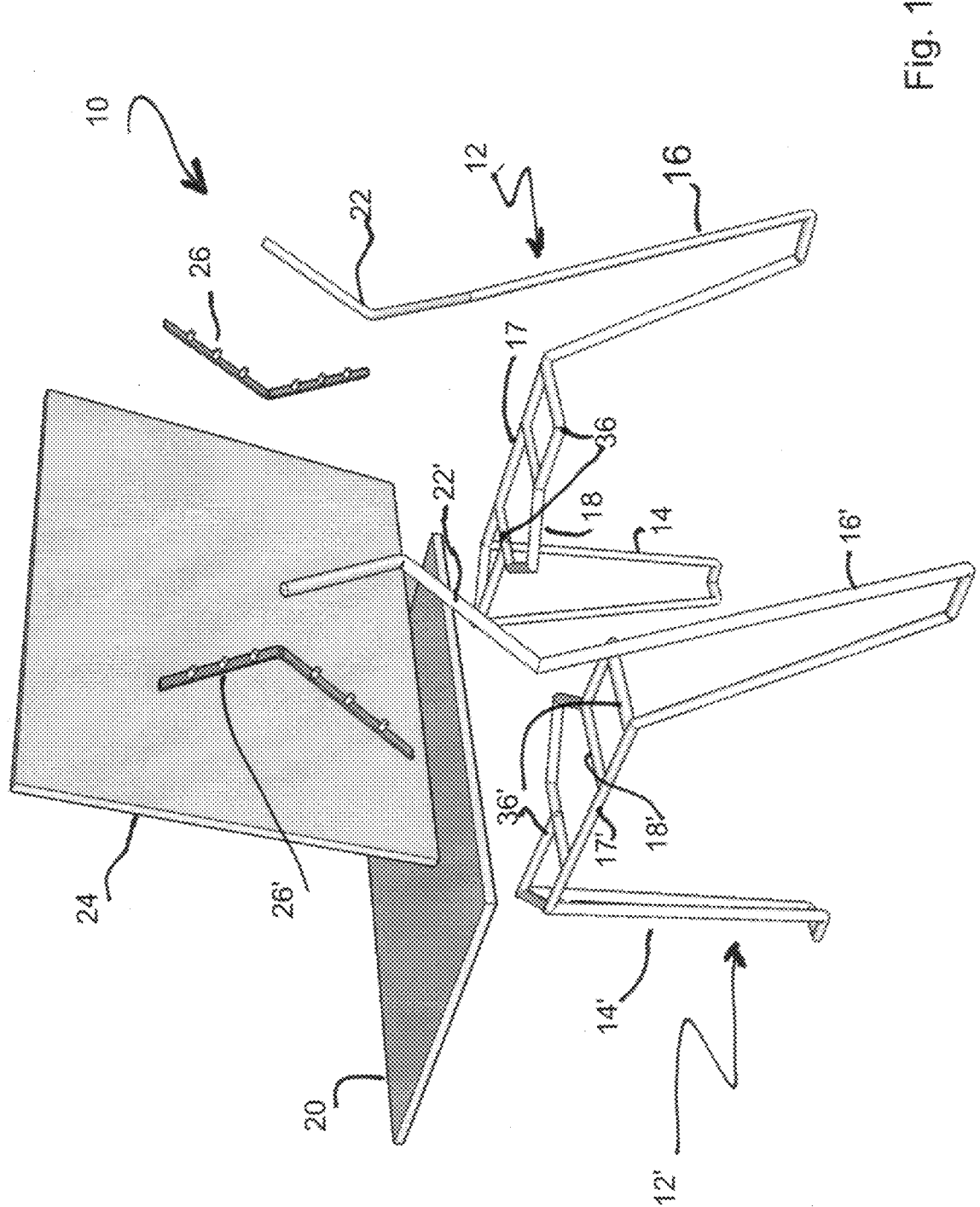
FIG. 1 shows a rear exploded perspective view of a piece of modular furniture utilizing two supports in accordance with the invention.

FIG. 1 shows an inventive piece of furniture made in accordance with the invention, shown generally at 10. As illustrated, piece of furniture 10 includes two supports 12 and 12'. Supports 12 and 12' are essentially mirror images of one another and are intended to be used as the left and right supports, respectively (when viewed from the front), of piece of furniture 10. It will be appreciated that the terms "left" and "right" as used herein refer to the sides of piece of furniture 10 when viewed from the front thereof, which is to say from the viewpoint looking up from the page of FIG. 1. That being said, "left" and "right" and "front" and "back" are essentially arbitrary designations for ease of reference and have meaning only in relationship to one another. Similarly, "up", "down", "top" and "bottom" are used with reference to the positioning of piece of furniture 10 as shown in the drawings, and as intended to be used. Because components of embodiments can be positioned in a number of different orientations, the directional terminology is used for purposes of ease of understanding and illustration only and is not to be considered limiting.

Supports 12 and 12' have generally the same (but mirrored) components, and so components of support 12' which correspond to similar components of support 12 are designated by a prime ("'"), and will not be separately described, except as may be needed for a clearer understanding of the invention.

For purposes of the following description, it is presumed that piece of furniture 10 sits on a perfectly level floor, lying in the horizontal plane. "Vertical" is therefore intended to mean the direction defined by a normal drawn perpendicular to the horizontal floor. Otherwise, as will be appreciated by one of ordinary skill in the art, piece of furniture 10 may actually be positioned on a floor at any angle with respect to "true" horizontal. Further, the floor may be uneven, or non-planar. However, the relative positioning of the components of piece of furniture 10 are not affected by the environment in which it is used, and so will remain unchanged, except as may be noted herein.

Support 12 includes a first, front, leg 14 and a second, rear, leg 16 connected by a longitudinal member 17 having a support member 18 used to support a seat 20. First leg 14, second leg 16, longitudinal member 17 and support member 18 together comprise a base for piece of furniture 10.

Figure 2:
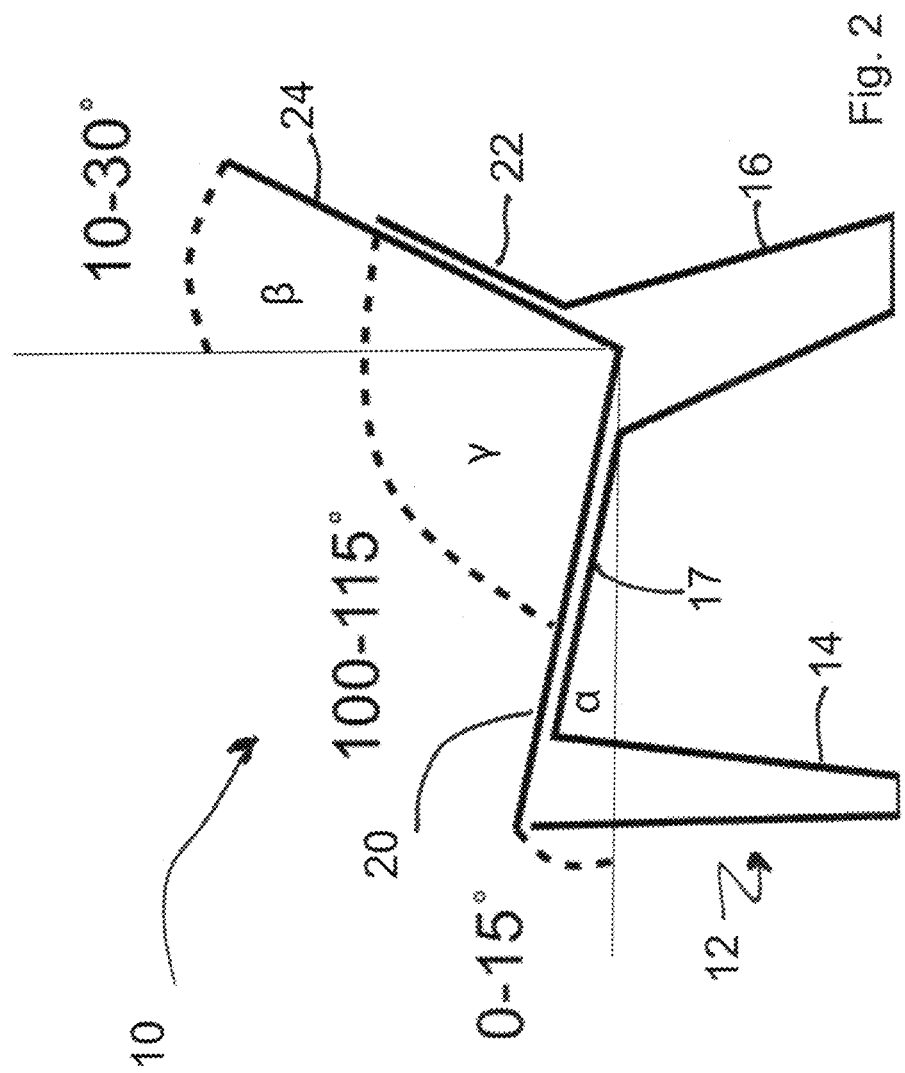
FIG. 2 shows a stylized side elevation of the piece of furniture shown in FIG. 1.

Preferably, if piece of furniture 10 is intended to be for sitting and includes a back (described below), such as a chair, sofa or settee, for comfort, front leg 14 rises slightly higher from the horizontal than does rear leg 16, so that longitudinal member 17 (and seat 20) will preferably lie at an angle $\alpha$ falling in the range of up to about 15° from the horizontal (see, FIG. 2). If piece of furniture 10 is intended to be used without a back, such as as a table or ottoman, then angle $\alpha$ preferably lies closer to the horizontal. If intended for use as, for example, a drafting table, angle $\alpha$ could be higher, such as, for example, in the range of about 30° to about 50°, depending on the nature of the intended use. The specific value for angle $\alpha$ is therefore a matter of design choice.

In an embodiment in which the user intends to sit on piece of furniture 10, piece of furniture 10 preferably includes a back support 22 to which a back 24 may be attached by a fastener 26. Back support 22 preferably extends upwardly from second leg 16 forming an angle $\beta$ between back 24 and vertical of from about 10° to about 30°, and may include a bend as shown for added stability. Alternatively, it could include a stiffening member affixed thereto. Also preferably, as shown in FIG. 2, back 24 forms an angle $\gamma$ with seat 20, with angle $\gamma$ preferably lying in the range of from about 100° to about 115°. It will be understood by those of ordinary skill in the art that angles $\alpha$, $\beta$ and/or $\gamma$ may be selected to fall outside of these preferred ranges as a matter of design choice in a particular application if so desired by the user.

In the preferred embodiment, the elements of piece of furniture 10 (other than seat 20 and back 24) are made of a sturdy, rigid material, such as wood, metal, plastic or any other suitable material. In the preferred embodiment, these elements are made primarily of hardened steel or solid hardwoods. Front leg 14 has a height preferably in the range of about 12 inches to about 18 inches from the horizontal, and the length (depth) of longitudinal member 18 is preferably in the range of from about 15 inches to about 30 inches, depending upon the application. The height of rear leg 16 therefore depends on the height of the corresponding front leg 14, the depth of seat 20 (and the concomitant length of longitudinal member 17) and the value of angle $\alpha$ selected for the particular application.

The width of piece of furniture 10 depends upon the width of seat 20 and the intended application. An end table, for example, may be only six to eight inches wide, while a sofa may be six to eight feet wide. Supports 12 and 12' are spaced apart to accommodate the width of seat 20 and provide support therefor, as will be described presently.

Support members 18, 18' preferably extend from supports 12, 12' (respectively) in a direction toward the opposing support 12', 12 (respectively) to a distance suitable to provide support to seat 20, such as in the range of about one inch to about fifteen inches depending upon the width of seat 20.

Figure 3:
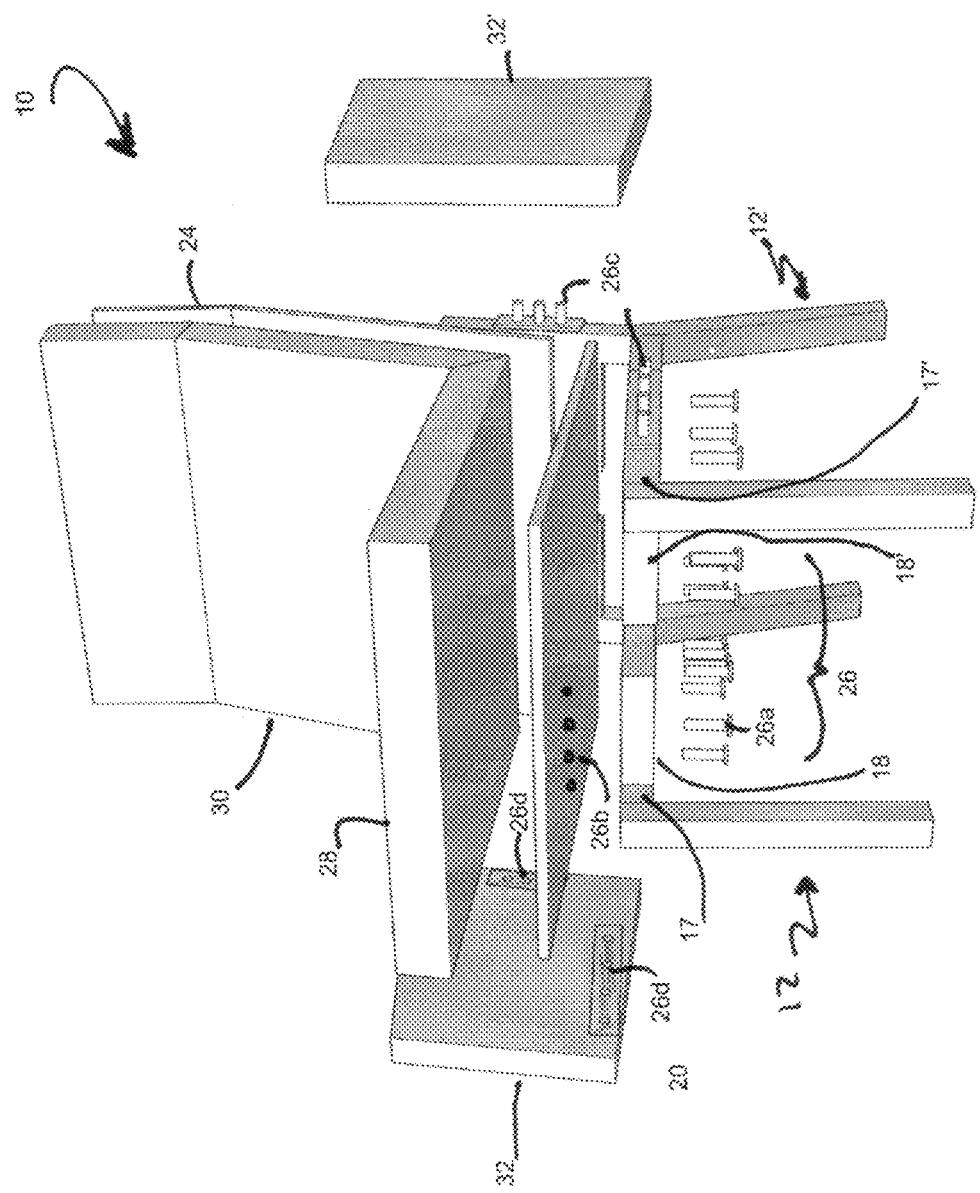
FIG. 3 shows a front exploded perspective of an alternative embodiment of the inventive piece of furniture, having arms and cushions.

Seat 20 and back 24 may preferably be made of any suitable firm yet supporting material and may also include a cushioning element 28 on seat 20 and/or a further cushioning element 30 on back 24 where the user comes into contact with those components (see, FIG. 3). Any kind of cushioning may be utilized, as a matter of design choice, such as, for example, foam rubber, other foam (e.g., polyurethane foam), horsehair-stuffed cushions, air pillows and the like. In the most preferred embodiment, polyurethane foam is utilized.

Continuing with reference to FIG. 3, piece of furniture 10 may optionally include arms 32 which may be attached to piece of furniture 10 in any conventional fashion, such as by fasteners or screws 26c, d.

Returning to FIG. 1, fastener 26 may be of any suitable kind, and may be a known two-piece fastener, such as a hook-and-loop fastener, a snap fastener, a tongue-and-groove fastener, a threaded fastener (such as a nut/bolt arrangement), a magnetic fastener, or a male/female fastener. In this case, one piece of two-piece fastener 26 would be affixed to, or part of, back support 22, and the other placed in a corresponding manner on the rear of back 24 to ease assembly of piece of furniture 10. Similarly, seat 20 may be affixed to supports 12, 12' by a further fastener (omitted for clarity). In the most basic embodiment, two-piece fastener 26 is a screw-and-thread arrangement, as shown in FIG. 3, where screws 26a are screwed into holes 26b (only some of which are shown for clarity) to retain the two pieces together. In an alternate embodiment, as also depicted in FIG. 3 with respect to arms 32, fastener 26 may be a male/female arrangement where male elements 26c are inserted into, and retained in, female elements 26d, as for example by snap-fit or magnetic locking.

One of ordinary skill in the art would be able to select a suitable fastener 26 depending upon the pieces available, the costs of the various types of fastener available at the time of construction and any other consideration which may arise at the time of manufacture.

A further embodiment of the inventive piece of furniture 10 is shown in FIG. 4. In this embodiment, piece of furniture 10 is wider than necessary to accommodate a single user, as, for example in the case of a coffee table, sofa or settee. In this case, a wider seat 20 and/or back 24 are needed. To provide support for the wider seat 20 and/or back 24, a third support 12" may be utilized. The basic components of third support 12", such as front leg 14" and rear leg 16" correspond generally to the corresponding components of first and second support 12 and 12', the numbering of which is omitted from FIG. 4 for clarity. Third, or middle, support 12" also includes a third support member 18" which may differ from support members 18 and 18' in that it preferably (but not necessarily) includes two opposed support members 18a, 18b. In the preferred embodiment, support members 18a and 18b are generally mirror images of one another, extending outwardly from support 12" towards supports 12 and 12', respectively, and thereby provide additional support to seat 20. Longitudinal member 17" is preferably generally at the same angles α and γ as longitudinal members 17 and 17' to offer the optimum support for seat 20 and/or back 24.

Similarly, in those applications in which a wider piece of furniture 10 will be used for sitting, support 12" preferably has a third back support 22", similar to back supports 22 and 22', to provide additional support for back 24.

Seat 20 and back 24 are preferably attached to third support 12" with a further fastener or fasteners (not shown) similar to fastener 26.

In a refinement of the preferred embodiment, and as shown in FIG. 1, each support member 18 and 18' includes at least two braces 36, 36', respectively. Braces 36, 36' each form a supporting area therebetween which serves to increase the effective surface area of support member 18 and 18', thereby increasing the support offered thereby.

The inventive support as described herein provides significant benefits in manufacturing and assembly compared to prior art modular furniture.

The design hereof can be standardized, so that either all support members are identical (but for being 'left" or "right") or in a small number of sizes for a range of construction options. Once the supports are manufactured, they may be easily assembled either by a technician or the end user, by simply fastening together the components via fasteners 26, for example by snapping pieces together without even requiring any tools, if fastener 26 is a snap-fastener. The resultant piece of furniture may also be easily disassembled by un-fastening fastener 26, and then reconfiguring the elements, as, for example, changing seat 20 and/or back 24 due to wear, or a change in purpose, such as making it larger or simply changing its appearance.

In yet another embodiment, where it is not intended that the components will be disassembled, fastener 26 may be a permanent fastener, such as an adhesive or other similar means for securing the components together.

While there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piece of furniture comprising:
    a seat;
    a first support; and
    a second support;
    said first support having
        a first base having first and second legs connected by a first longitudinal member, said first longitudinal member extending in a first direction; and
        a first support member, for supporting said seat, said first support member extending from said first longitudinal member in a second direction generally transverse to said first direction and towards said second support, so that said first support member may extend under said seat and provide support thereto;
    said second support having
        a second base having first and second legs connected by a second longitudinal member, said second longitudinal member extending in a third direction generally parallel to said first direction; and
        a second support member, for further supporting said seat, said second support member extending from said second longitudinal member in a fourth direction generally transverse to said third direction, generally opposite to said second direction and generally towards said first support, so that said second support member may extend under said seat and provide further support thereto;
    wherein said first support member and said second support member extend generally towards one another, and under said seat, so that, together, said first and second support members may co-operate to support said seat;
    wherein said first support member extends towards said second support member by a first distance which lies in the range of from about one eighth to about two fifths of the width of said seat;
    wherein said second support member extends towards said first support member by a second distance which lies in the range of from about one eighth to about two fifths of the width of said seat; and
    wherein said first support and said second support are not directly connected, and are connected only indirectly via said seat.

2. The piece of furniture of claim 1, further comprising:
    a back; and
    a first back support extending from said first leg of said first support in a fifth direction transverse to both said first and third directions, to support said back.

3. The piece of furniture of claim 2, further comprising:
a second back support extending from said first leg of said second support in a sixth direction transverse to both said second and fourth directions, and generally parallel to said fifth direction;
whereby said first and second back supports may co-operate to support said back.

4. The piece of furniture of claim 2, further comprising:
a second fastener for fastening said back support to said back.

5. The piece of furniture of claim 2, wherein said fifth direction lies in a plane which forms a first angle with respect to the vertical, said first angle falling in the range of from about 10° to about 30° with respect to the vertical.

6. The piece of furniture of claim 2, wherein said seat and said back define a second angle therebetween, said second angle falling in the range of from about 100° to about 115°.

7. The piece of furniture of claim 1, further comprising:
a fastener, for fastening said support member and said seat together.

8. The piece of furniture of claim 7, wherein said fastener is a two-piece fastener.

9. The piece of furniture of claim 8, wherein said two-piece fastener is selected from the group consisting of: a hook-and-loop fastener, a snap fastener, a tongue-and-groove fastener, a threaded fastener, a magnetic fastener, and a male/female fastener.

10. The piece of furniture of claim 8, wherein the second piece of said two-piece fastener is attached to said seat.

11. The piece of furniture of claim 1, wherein said first support member includes at least two braces extending generally in said second direction, whereby said braces provide support for said seat.

12. The piece of furniture of claim 1, further comprising:
a third support, said third support having
a third base having first and second legs connected by a third longitudinal member, said third longitudinal member extending in a fifth direction, generally parallel to said first and third directions; and
a third support member, for supporting said seat, said third support member extending from said third longitudinal member in a sixth direction generally transverse to said fifth direction and towards one of said first support and said second support, so that said third support member may extend under said seat and provide support thereto, in co-operation with said first and second support members;
wherein said third support member extends towards said one of said first support and said second support by a third distance which lies in the range of from about one eighth to about two fifths of the width of the seat; and
wherein said third support is not directly connected to either said first or second supports, and said first, second and third supports are connected only indirectly via said seat.

13. The piece of furniture of claim 12, wherein said third support also has a fourth support member, for supporting said seat, said fourth support member extending from said third support in a seventh direction generally opposite to said sixth direction and towards the other of said first support and said second support, so that said fourth support member may extend under said seat and provide support thereto, in co-operation with said first, second and third support members.

14. The piece of furniture of claim 12, wherein said third distance lies in the range of from about one inch to about fifteen inches.

15. The piece of furniture of claim 1, wherein said first direction lies in a plane which is no more than about 15° from the horizontal.

16. The piece of furniture of claim 1, wherein at least one of said first distance and said second distance lies in the range of from about one inch to about fifteen inches.

* * * * *